United States Patent
Tornielli et al.

(10) Patent No.: US 10,743,084 B2
(45) Date of Patent: Aug. 11, 2020

(54) FORWARDING VIDEO CONTENT

(71) Applicant: PIKSEL, INC., Wilmington, DE (US)

(72) Inventors: Giorgio Tornielli, Mortara (IT);
Stefano Valsecchi, Monza (IT);
Gabriele Ferrari, Milan (IT)

(73) Assignee: PIKSEL, INC., Wilmington, DE (US)

( * ) Notice: Subject to any disclaimer, the term of this patent is extended or adjusted under 35 U.S.C. 154(b) by 0 days.

(21) Appl. No.: 15/535,191

(22) PCT Filed: Dec. 11, 2015

(86) PCT No.: PCT/EP2015/079500
§ 371 (c)(1),
(2) Date: Jun. 12, 2017

(87) PCT Pub. No.: WO2016/092104
PCT Pub. Date: Jun. 16, 2016

(65) Prior Publication Data
US 2017/0325004 A1 Nov. 9, 2017

(30) Foreign Application Priority Data

Dec. 12, 2014 (GB) .................................. 1422135.2

(51) Int. Cl.
| | |
|---|---|
| H04N 5/783 | (2006.01) |
| G06Q 30/02 | (2012.01) |
| G06Q 20/10 | (2012.01) |
| H04N 21/81 | (2011.01) |
| H04N 21/262 | (2011.01) |
| H04N 21/458 | (2011.01) |
| H04N 21/6587 | (2011.01) |
| H04N 21/472 | (2011.01) |
| G06K 9/00 | (2006.01) |
| H04N 21/254 | (2011.01) |

(52) U.S. Cl.
CPC ..... *H04N 21/812* (2013.01); *H04N 21/26258* (2013.01); *H04N 21/458* (2013.01); *H04N 21/47202* (2013.01); *H04N 21/47217* (2013.01); *H04N 21/6587* (2013.01)

(58) Field of Classification Search
None
See application file for complete search history.

(56) References Cited

U.S. PATENT DOCUMENTS

| | | | | |
|---|---|---|---|---|
| 8,060,407 B1* | 11/2011 | Delker | ................... | G06Q 30/00 705/14.61 |
| 8,625,974 B1* | 1/2014 | Pinson | ................... | H04N 5/783 386/350 |
| 9,697,295 B1* | 7/2017 | Nijim | ................... | G06F 16/955 |

(Continued)

OTHER PUBLICATIONS

International Search Report and Written Opinion, dated Mar. 21, 2016, European Patent Office.

*Primary Examiner* — Nasser M Goodarzi
*Assistant Examiner* — Terrika Peterson

(57) ABSTRACT

The invention relates to a method for implementing forwarding in playback of video content, in which the video content is associated with commercials, the method comprising: determining a set of commercials that are skipped in forwarding the video content; and applying a function to determine the playback of the set of commercials when the forwarded video content is played, wherein the function is programmable.

10 Claims, 2 Drawing Sheets

(56) References Cited

U.S. PATENT DOCUMENTS

| | | | |
|---|---|---|---|
| 2008/0281448 A1* | 11/2008 | Uhrig | G06Q 20/10 700/94 |
| 2010/0061709 A1* | 3/2010 | Agnihotri | H04N 5/445 386/241 |
| 2010/0235238 A1* | 9/2010 | Gupta | G06Q 30/02 705/14.56 |
| 2011/0212717 A1* | 9/2011 | Rhoads | G06K 9/00664 455/420 |
| 2011/0243533 A1* | 10/2011 | Stern | H04N 21/2541 386/278 |
| 2012/0072272 A1 | 3/2012 | Kilar et al. | |
| 2014/0189139 A1* | 7/2014 | Cheng | H04L 65/60 709/231 |
| 2015/0026708 A1* | 1/2015 | Ahmed | H04N 5/23206 725/12 |
| 2017/0236160 A1* | 8/2017 | Oberoi | G06Q 30/0261 705/14.66 |
| 2017/0339114 A1* | 11/2017 | Watson | G06F 21/64 |

\* cited by examiner

FORWARDING VIDEO CONTENT

BACKGROUND TO THE INVENTION

Field of the Invention

The present invention relates to the forwarding of video content play back, which may be referred to as forward seeking. The invention particularly relates to the forwarding of video content play back when the video content is associated with commercials.

Description of the Related Art

The forwarding of video content play back in video services such as video-on-demand services is known. The forwarding of video content play back is also known as forward seeking, when the content of the video is "fast forwarded" from a current position to a future position.

When video content is associated with commercials, then the forwarding of the video from one point in time to a future point in time may result in commercial content which was to be displayed during that time period being skipped.

In known applications, when the content of a video is fast forwarded, a fixed determination is made with respect to any commercials which may be associated with the time portion through which the content has been fast forwarded. This may be to simply ignore all commercials for this time period.

It is an aim to provide an improved technique associated with forward seeking of video content.

SUMMARY OF THE INVENTION

In accordance with the invention there is provided a method for implementing forwarding in playback a video content, in which the video content is associated with commercials. The method comprises: determining a set of commercials that are skipped in forwarding the video content; and applying a function to determine the playback of the said commercials when the forwarded video content is played. The function is programmable.

There is therefore provided a programmable (or dynamic) behaviour for dealing with commercials when video content is forwarded. This behaviour is associated with any commercials associated with a time period through which the video content has been forwarded.

The method may comprise storing an identity of the skipped commercials, and may apply the function to the stored identities, and may create a modified list of commercials.

The commercials may comprise linear adverts and overlays, and a different function may be applied to linear adverts and overlays.

In this way, different types of commercial content may be treated differently, such that linear adverts and overlays are treated differently when forward seeking is applied to the video content.

The function may be programmed according to the device on which an associated video player is implemented. The function may be programmed differently for different devices associated with the same user. Thus, for example, a portable device (e.g. a mobile phone) associated with a user may be programmed differently to a fixed device (e.g. a television) associated with the same user. In this way different devices associated with the same user may behave differently in respect of commercials which are skipped when video content is forwarded.

The function may be programmable in dependence on a number of criteria. The criteria may include minimising the impact on the end user, and/or maximising the number of commercials shown.

There is also provided a video playback device for playing videos associated with commercials. The device is configured, in dependence of forwarding of the video content, to: determine a set of commercials that are skipped in forwarding the video content; and apply a function to determine the playback of the set of commercials when the forwarded video content is played. The function is programmable.

The video play back device may further comprise a memory configured to store the identity of the skipped commercials, apply the function to the stored identities, and create a modified list of commercials. The video player may be configured to apply a different function in dependence on whether a commercial is a linear advert or an overlay.

The plurality of devices may each include a video play back device in which the video player of at least one device is programmed to have a different functionality to others. The plurality of devices may be associated with the same user.

BRIEF DESCRIPTION OF THE FIGURES

The invention is now described with reference to the accompanying figures in which.

DESCRIPTION OF THE PREFERRED EMBODIMENT

There are two core video advert format categories in current in-stream advert experiences. These are linear video adverts and non-linear video adverts.

A linear video advert is presented before, in the middle of, or after the video content is consumed by the user, in much the same way a as broadcast TV commercial can play before, during or after the chosen broadcast program. One of the key characteristics of a linear video advert is that the user watches the advert in addition to the content as the advert takes over the full view of the video. Common linear video advert formats include pre-rolls, interactive takeovers, and short bumper vignettes that appear prior to a video content stream.

A non-linear video advert runs concurrently with the video content, so the user sees the advert while viewing the content. Non-linear video adverts can be delivered as text, a graphical advert, or as a video overlay. Common non-linear video advert formats include overlays or product placements. Overlays are shown directly over the content video itself. An overlay advert can also be delivered over a linear advert experience as well, generally prompting the user to interact with the advert when a user mouse moves over the advert. Product placements are adverts placed within the video content itself.

Video players in online video distribution services may provide a forward seeking function. If the user is watching a video at time $t_1$, they can forward seek (fast forward) to time $t_2$ (where $t_2$ is greater than $t_1$). In general, for videoon-demand (VOD) assets it is possible to seek to any time point in the video, either in the past or in the future with respect to the current time instance. For the purpose of this description only forward seeking is considered.

In the case of a video distribution service based on advertising it is possible that because of the forward seeking action the end-user misses some of the commercials that were scheduled in the time interval $t_1$ to $t_2$, $[t_1, t_2]$ denoting the time interval $t_1$ to $t_2$. These commercials can be either linear adverts or overlays.

When a forward seeking action is carried out by the end-user, different video services implement different behaviour with respect to the skipped commercials. Some permit the end user to skip all the advertising. Others force the user to watch all the advertising, with all skipped commercials being shown in sequence before the main video content is actually restarted. Others show only a subset of the skipped advertising, where the selection of which commercials to show is based on business logics that could change from customer to customer.

When a video player is developed, the desired behaviour with respect to skipped commercials during forward seeking is typically hard coded in the video player itself.

Figure 1:
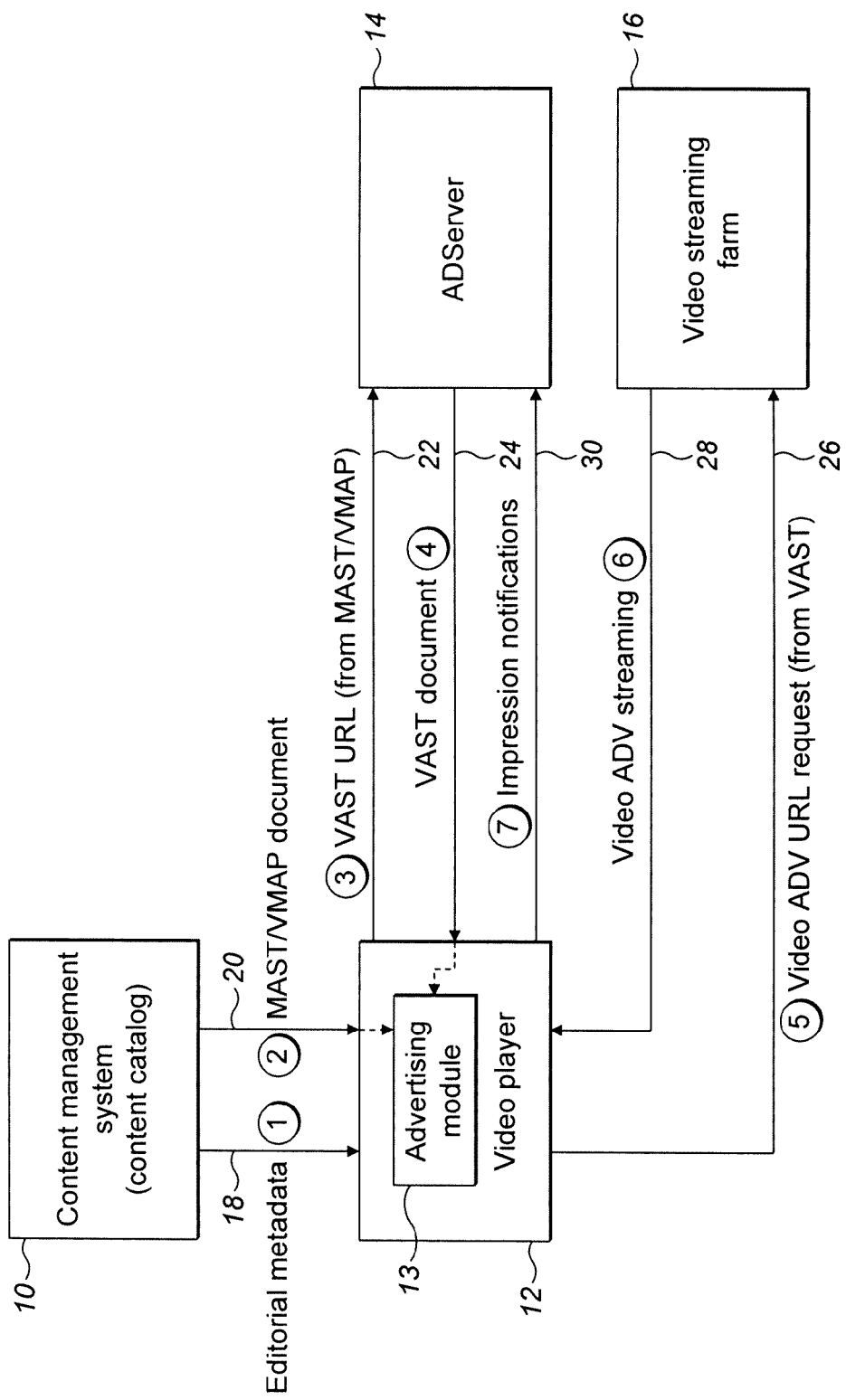
FIG. 1 illustrates an exemplary architecture of a video player subsystem in which examples may be implemented.

An example on-line video player architecture in which an advertising scenario is implemented is shown in FIG. 1. The architecture includes four entities: a content management system 10; a video player 12; an advertising server (AD-server) 14; and a video streaming farm 16. The content management system 10 comprises a content catalog. The video streaming farm may comprise a plurality of servers having video content.

The video player 12 includes various modules for implementing the video operation. An advertising module 13 is shown.

The content management system 10 enables an editorial team to define video assets and their associated metadata, such as video title, synopsis, video URL etc. This data is used to compose a catalog that is then offered by the video service to end-users, hence this system also being referred to as a content catalog.

When the end user selects a video, this is played by the video player 12. If the video service is based on advertising, in addition to receiving the editorial metadata describing the video in a message on signal line 18, the video player 12 also receives a document defining what type of advertising and when that advertising has to be displayed for that video in a message on signal line 20. In some scenarios the information about when advertising has to be shown is hard-coded in the video player, and it cannot be easily changed over time. In other scenarios information about when advertising has to be shown is specified using the content management system 10, and the information is passed to the video player 12 together with the other metadata associated with each video asset. To document defining what type of advertising has to be displayed may define for example, for the video at hand, that three mid-rolls have to be introduced, one at 25% of the video length, another at 50% and another at 75%. The video player uses the information contained in this document to play commercials at the right time.

When the video player 12 determines, based on the information contained in the document in the message on signal line 20, that a commercial break must be played it engages in a dialog with the advertising server 14. The advertising server 14 is the component that may be used to define advertising campaigns. When the advertising server 14 is queried by a message on signal line 22 from the video player 12, it returns another document containing the list of commercials that must be displayed and the features of each of them in a message 24 on signal line 24. Which commercials are returned by the advertising server 14 depends on a number of factors, such as the currently active campaigns, the time of day or the characteristics of the end-user who is watching the video. For example the advertising server 14 may return, for an advertising break, the URLs of three commercials that must be shown in that break, and for each commercial it could also return additional information such as whether that advert can be skipped or not, and the URL that must be contacted to inform the advertising server 14 that the video has been actually shown to the end-user.

The document with the message on signal line 24 specifies all the information that can be returned from the advertising server 14 to the video player 12.

When the video player 12 receives the document with the message on signal line 24, then it determines which advertising has to be shown, and with a message on signal line 26 requests the streaming farm 16 to actually play the commercial. The video player 12 receives the video content with a message on signal line 28 and plays the video content. The video player 12 enforces the rules that are specified in the document with the message on signal line 24, if any, and then informs the advertising server 14 that the commercial has been actually shown with a message on signal line 30.

The sequence involving messages on signal lines 22 to 30 is repeated by the video player 12 for each advertising break specified in the document provided by the original message on signal line 20.

A few standardized document formats have been introduced over time by the on-line video community for expressing the kind of information provided in the documents on signal lines 20 and 24: MAST (media abstract sequencing template) introduced by Akamai; VMAP (video multiple and playlist) proposed by the IAB (Interactive Advertising Bureau; and VAST (video and servicing template) also proposed by the IAB.

The document with the message on signal line 20 may be a MAST or VMAP document. The document with the message on signal line 24 may be a VAST document.

An example of a MAST document is given in Appendix 1. This example MAST document specifies two triggers, namely two time instants in the video when commercials are to be displayed. The first trigger specifies that advertising must be displayed as soon as the video is started (pre-roll). In that case, a VAST document describing which commercial to show must be retrieved at the specified URL. The second trigger specifies that another commercial must be displayed at exactly 2 minutes and 30 seconds from the beginning of the video. In general, MAST permits to specify start conditions for a commercial as the parameter ("Start-Conditions") a broad range of conditions and logical expressions.

An example of a VMAP document is given in Appendix 2. In this example it is specified that the advertising break only consists of one video that will be specified in a VAST document at the given URL.

An example of a VAST document is given in Appendix 3. In this example the VAST document specifies the kind of advertising that must be shown (inline advertising), which advertising server is returning the VAST document (DART DFA), where to track impressions, how to manage errors and finally the list of creative content (i.e. adverts or commercials) comprising the advert break, that in this case is just one video commercial.

A video player 12 may be provided in a commercial product as a video player SDK (software development kit)

consisting of a number of predefined software modules that software developers can compose and configure in order to obtain the complete video player.

The advertising module 13, managing video advertising of the video player, is one of these predefined modules provided by the video player 12.

This description now sets out a method that may be implemented in a video player SDK, and specifically in the advertising modules 13 of the video player 12. This method may be offered to software developers for the configuration of the behaviour of a video player with respect to skipped commercials during forward seeking. The method permits to implement any desired behaviour, without rewriting the complete advertising module 13 but instead simply reordering or changing the list of creative content (commercials or adverts) that has been skipped.

At player configuration time, a software developer can specify a function, termed FC (forward correction) which is implemented in the advertising module. The function FC has two input variables. The two input variables are a list of linear commercials which can be designated as C, and a list of overlays which can be designated as C. The function FC returns two variables designated as C1 and O1, respectively representing a revised list of linear commercials and a revised list of overlays.

Figure 2:
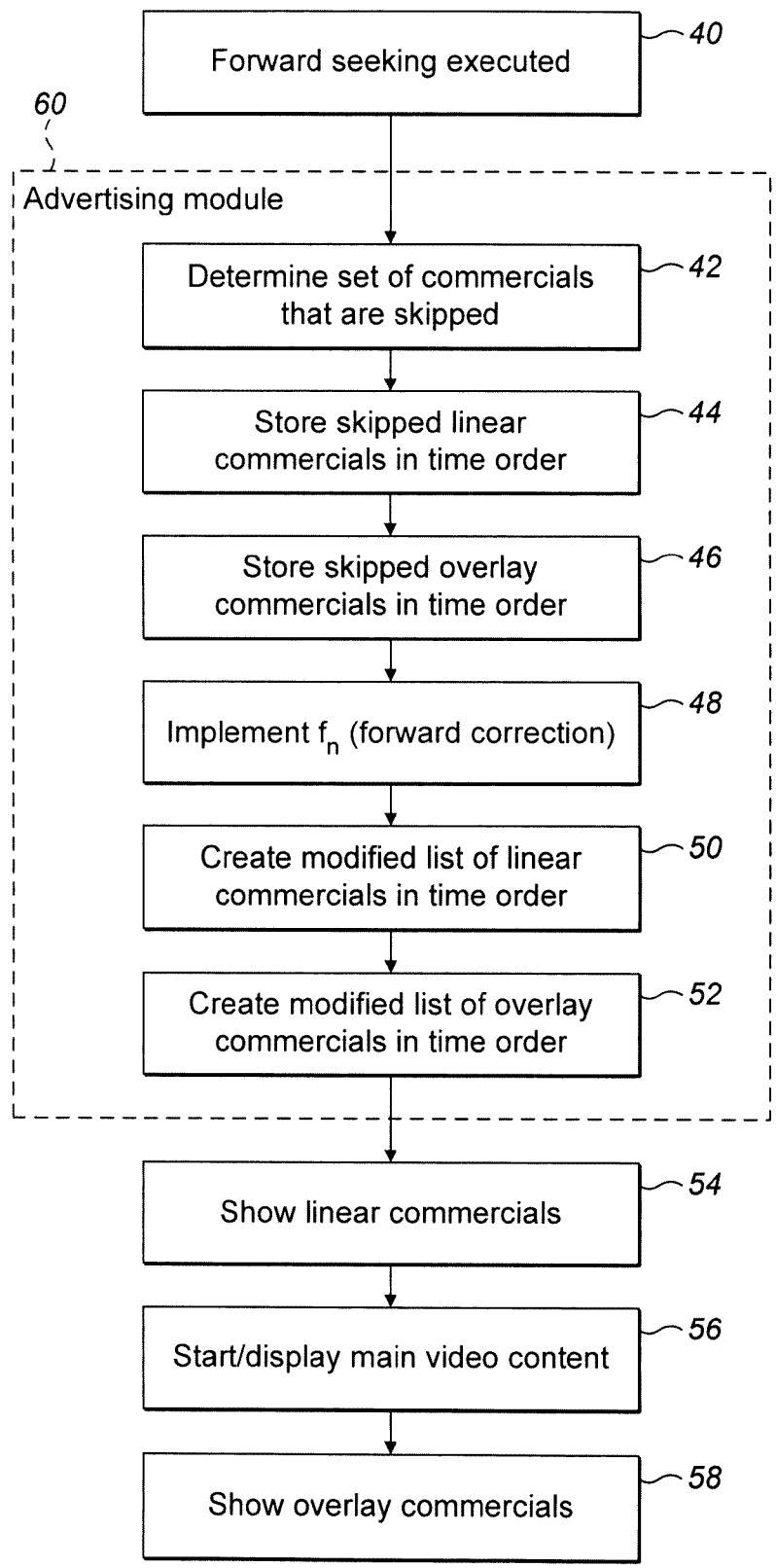
FIG. 2 illustrates a process flow in accordance with an exemplary implementation.

When a forward seeking activity is executed, forwarding the video content from a time $t_1$ to a time $t_2$, a method is executed, as illustrated in FIG. 2, in the advertising module 13. The step 40 denotes the execution of a forward seeking activity.

As denoted in the figure, following detection of execution of a forward seeking activity, a sequence of steps 60 are executed by the advertising module 13.

When forward seeking is executed and completed, the advertising module 13 determines the set of commercials that are skipped. This comprises determining the set of commercials that are skipped from time $t_1$ to time $t_2$. This determination may be quite complex. The advertising module 13 may analyse the document provided to the video player 12 in the message on signal line 20 which may be a MAST/VMAP document in order to make this determination.

This analysis is performed by a function denoted P, which must be able to deal with the following two cases.

1. The document provided by the message on signal line 20, which may be a MAST/VMAP document, contains a trigger with a condition reporting the exact time instant, denoted Tc, when the commercial should be played. In this case, function P simply has to verify if $T_c$, is contained in the time period $[t_1, t_2]$. In that case the trigger is added to the results returned by P.
2. The document provided by the message on signal line 20, which may be a MAST/VMAP document, contains a trigger with a condition described as a general logical expression. In this case, function P evaluates the condition for each time instant (at the defined time granularity such as 'seconds') contained in the time period $[t_1,t_2]$ in order to verify if it will be ever verified in that interval. If the trigger's condition could be verified in time interval $[t_1,t_2]$, the trigger is added to the results returned by P. In the case the trigger is verified for more than one time instant in $[t_1,t_2]$, it is added to the results as many times as it is verified. The latter situation may happen when the trigger specifies a recurring condition, such as, 'show the advert every 10 minutes'.

For each of the triggers computed by function P above, the advertising server 14 is contacted and this server 14 will return a corresponding document, such as a VAST document as a message on signal line 24. This document contains the actual commercial that should have been visualised. The set of commercials corresponding to all triggers previously computed is what P finally returns.

The set of commercials that are returned by the function P can be a subset of all the commercials that could have been shown to the end-user if they had not forwarded the video content to time $t_2$. The results returned by function P may not include commercials corresponding to triggers/conditions whose validity cannot be determined by the simple simulation performed in the second case above. This may happen, for example, when the trigger's condition depends on events contained in the video asset, such as specific markers that were included in the video when it was encoded. These markers may only be determined by downloading and analysing the video in the time interval $[t_1,t_2]$. However this may not be feasible because of time constraints—the end-user expects a forward seeking operation to be almost instantaneous, and all the method steps must be performed in real-time.

In the method, the advertising module 13 retrieves from the document on signal line 24 from the advertising module 24, such as the VAST document, all the skipped commercials returned by the function P, as denoted by step 42. The advertising module thus does not retrieve the identity of all the skipped commercials from the document, but only those which the function P returns.

The skipped commercials, with their associated specifications from the document, such as the VAST document, are divided into linear adverts and overlay adverts. The two sets are then stored in variables LSC (linear skipped commercials) and OSC (overlay skipped commercials) respectively. This is denoted by steps 44 and 46 respectively. The contents of LSC and OSC are preferably ordered with respect to time.

The advertising module 13 then calls function FC, and provides variables LSC and OSC as inputs to the function. As denoted by step 48, the FC function is implemented.

The outputs returned by the function FC represent the set of linear advertising and overlays that the advertising module 13 will control the video player 12 to show to the end-user. This is denoted by respective steps 50 and 52.

Then, as denoted by step 54, the advertising module will control the video player 12 and show all the linear advertising returned by the FC function. As denoted by step 56 the main video content will then start, and as denoted by step 58 any overlays returned by the FC will be displayed.

Function FC can be implemented as any specific logic with respect to the skipped commercial after a forward seeking operation, and is not hard-coded. The function is programmable. This is the only function that need be configured by a developer when a video player implementing a custom forward seeking behaviour is developed. Predefined FC functions may be provided in a video player, to provide standard of default behaviour in the absence of any customised configuration being provided. The default behaviour may be to configure the function FC to return all skipped commercials.

The function FC may comprise parts to apply different types of logic to different types of commercial, such as linear adverts and overlay.

Utilising this method video players may be developed for different end-user devices such as mobile devices, personal computers (PCs), smart televisions, etc. The desired behaviour for forward seeking may be different from one device to another. For example, on a mobile device it may be determined to only show one commercial after a forward seek, whilst on a smart television it may be determined to show more than one commercial. A specific FC function may be provided for each different type of end-user device that must be served.

The function FC may be programmed differently for different devices associated with the same end user.

Linear and overlay adverts have a different behaviour with respect to the main video that is hosting the commercial: the former require the main video to be interrupted in order to show the video advert; the latter do not require the main video to be interrupted. Therefore they have a different impact on the end-user experience when the forward seeking behaviour is configured.

In the case of forward seeking the end-user is in some way interrupting the main video and hence, before the video is actually re-started from the new position selected by the end user, a linear commercial could be inserted and shown to the end-user.

After the main video is then re-started, it is a matter of choice to immediately show one or more overlays (assuming some overlays were actually skipped and there is no overlapping with another overlay that should be naturally shown at that time in the video).

Assuming that, because of the forward seeking action, both linear and overlays have been skipped, presenting an overlay just after a linear advert may be annoying for the end user.

For this reason overlay adverts that have been skipped may be ignored.

However in accordance with the described technique the service provider is provided with all the information needed to decide what kind of advertising and how many adverts to show after a forward seeking action by the end-user. The decision can then be taken based on a number of criteria, such as minimizing the impact on the end-user experience, maximizing the number of adverts shown (and hence maximizing advertising revenues), or a combination of both.

Examples of possible configurations are now given.

In all the following examples it is assumed that because of the forward seeking action, both linear adverts and overlay adverts have been skipped, and hence variables LSC and OSC are both non-empty. Furthermore, it is assumed that overlays are not shown after the forward seeking (but the method permits to configure the function differently).

Example 1

The service provider wants to minimize the impact on the end-user: only one linear advert is presented after the forward seeking action.

Function FC returns C1 consisting of the first linear advert found in LSC whilst O1 is an empty set.

Example 2

Same as in Example 1, but the service provider has coded in function FC a business logic permitting to select among the skipped linear adverts the one that maximizes revenue. For instance, the service provider could sell advertising to different advertisers for a different price and in this case function FC selects among the plurality of linear adverts in LSC the one which guarantees the highest revenue. O1 is an empty set.

Example 3

The service provider is trying to balance the impact on the end-user experience with its returns and hence more than one linear advert is presented.

Function FC returns to C1 half of the linear adverts that have been skipped. O1 is again empty.

Example 4

The same as in Example 3 but the number of linear adverts that will be returned in C1 is a function of the duration of the main content video from the landing position after the forward seeking until the end of the video. Namely the closer the forward seeking is to the end of the main video, the fewer linear adverts are shown. O1 is again empty.

Example 5

In many cases, a single commercial break consists of an "ad pod", namely a sequence of linear adverts, similar to what happens in broadcast TV commercial breaks. This possibility is supported by the VAST standard, where it is possible to specify a linear break in the form of an AdPod consisting of a sequence of linear adverts.

When this is the case, the variable LSC takes a more complex form than a simple set of linear adverts, because it has to maintain the ad pod structure. For instance, variable LSC may be of the form:

$$LSC=\{c1,c2,\{c3,c4,c5\},c6\}$$

meaning that the forward seeking operation has skipped c1 and c2 linear adverts, then an ad pod consisting of c3, c4 and c5 linear adverts, and then another single linear advert c6.

Going back to the example, function FC could be designed to return in C1 the first ad pod in LSC, and if there are no ad pods, the first linear advert in it. For instance, if LSC is the following:

$$LSC=\{c1,c2,\{c3,c4,c5\},c6\}$$

FC may return in C1 the following:

$$C1=\{c3,c4,c5\}$$

The foregoing presents five examples (example 1 to example 5) by way of illustrating options, but they are simply examples and do not represent any limitation. Further any example given herein (whether one of these five examples or any other example set forth) may be combined with an individual feature of any other example. Different examples may be combined whole or in part.

Any method as described herein may be implemented in software. The implementation of any method and software may comprise executing computer program code. Any computer program code associated with the software implementation of any described method may comprise storing the computer program code in memory, such as memory installed within a device, or memory connected to a device (such as a memory card or other memory device connected, for example, through a USB connection). The execution of software comprises the execution of the software on any device, any device being, for example, a personal computer, a television, or a mobile device such as a mobile telephone.

The described techniques may be implemented for any fast-forwarding (or forward seeking). The technique is described herein in the context of particular examples, but is not limited to the details of these examples. Nor is the invention limited to any specific combination of features which are set out herein only for the purpose of illustration.

Appendix 1

```xml
<?xml version="1.0" encoding="UTF-8"?>
<MAST xmlns="http://openvideoplayer.sf.net/mast">
  <triggers>
    <trigger>
      <startConditions>
        <condition name="onItemStart" type="event"/>
      </startConditions>
      <sources>
        <source format="vast"
            uri="../Assets/vast_wrapper.xml?_id=[INIT_ID]&_c=[CACHEBUSTING]">
        </source>
      </sources>
    </trigger>
    <trigger>
      <startConditions>
        <condition name="position" type="property" value="00:02:30" operator="EQ"/>
      </startConditions>
      <sources>
        <source format="vast"
            uri="../Assets/vast_midroll.xml?[CONTENTPLAYHEAD]"/>
      </sources>
    </trigger>
  </triggers>
</MAST>
```

Appendix 2

```xml
<?xml version="1.0" encoding="UTF-8" standalone="no"?>
<VMAP xmlns:vmap="http://www.iab.net/vmap-1.0"
    xmlns:xsi="http://www.w3.org/2001/XMLSchema-instance"
    xsi:noNamespaceSchemaLocation="vast.xsd"
    xmlns:psns="http://microsoft.com/namespace/playersequencer/iabExtensions.xsd"
    version="1.0">
  <vmap:AdBreak breakType="linear" breakId="mymidpod" timeOffset="00:00:11">
    <vmap:AdSource allowMultipleAds="true" followRedirects="true" id="2">
      <vmap:AdTagURI templateType="vast">
        <![CDATA[http://prd.video.contoso.net/Assets/vast_wrapper.xml]]>
      </vmap:AdTagURI>
    </vmap:AdSource>
  </vmap:AdBreak>
</VMAP>
```

Appendix 3

```xml
<?xml version="1.0" encoding="UTF-8"?>
<VAST version="2.0">
  <Ad id="223626102">
    <InLine>
      <AdSystem version="2.0">DART_DFA</AdSystem>
      <AdTitle>In-Stream Video</AdTitle>
      <Description>A test creative with a description.</Description>
      <Impression id="DART">
            <![CDATA[track?impression0]]>
      </Impression>
      <Error>
            <![CDATA[error?[ERRORCODE]]]>
      </Error>
      <Creatives>
        <Creative id="1" sequence="1">
          <Linear>
            <Duration>00:00:15</Duration>
            <MediaFiles>
              <MediaFile id="1" height="336" width="816" type="video/mp4">
                <![CDATA]http://prd.video.contoso.net/ads/19367-1-1.mp4]]>
              </MediaFile>
            </MediaFiles>
          </Linear>
        </Creative>
```

| Appendix 3 |
| --- |
|       </Creatives><br>   </InLine><br> </Ad><br></VAST> |

The invention claimed is:

1. A method for implementing forwarding in playback of video content at a video playback device, in which the video content is associated with commercials including at least one linear advert and at least one non-linear advert, the method comprising:

playing the video content at the video playback device;

receiving at the video playback device a command to forward the video content from time $t_1$ to time $t_2$;

determining a set of linear adverts that are skipped in forwarding the video content from time $t_1$ to time $t_2$, and determining a set of non-linear adverts that are skipped in forwarding the video content from time $t_1$ to time $t_2$, wherein the determined sets are subsets of all the commercials that could have been shown between time $t_1$ and time $t_2$, excluding commercials between time $t_1$ and time $t_2$ for which it cannot be verified a trigger condition would have validly occurred between time $t_1$ and time $t_2$;

accessing a programmable function for determining playback of the set of linear adverts and the set of non-linear adverts that are skipped;

accessing a plurality of criteria for the playback of the set of linear adverts and the set of non-linear adverts that are skipped, the criteria comprising maximizing number of commercials that are shown and minimizing impact on end-user experience;

selecting at least one of the plurality of criteria for linear adverts and at least one of the plurality of criteria for non-linear adverts;

dynamically programming a first programmable function for linear adverts in dependence on the selected criteria for linear adverts;

dynamically programming a second programmable function for non-linear adverts in dependence on the selected criteria for non-linear adverts;

applying the dynamically programmed first programmable function for linear adverts to determine a playback subset of linear adverts that are skipped for playback after time $t_2$ when the forwarded video content is played at time $t_2$;

applying the dynamically programmed second programmable function for non-linear adverts to determine a playback subset of non-linear adverts that are skipped for playback after time $t_2$ when the forwarded video content is played at time $t_2$;

playing, from time $t_2$, the subset of linear adverts that are determined for playback from time $t_2$;

playing the video content on completion of the playing of the determined subset of linear adverts after time $t_2$; and playing the subset of non-linear adverts that are determined for playback after resumption of video playback.

2. The method of claim 1 further comprising:

storing an identity of the subset of linear adverts and the subset of non-linear adverts that are skipped, applying the dynamically programmed first programmable function and the dynamically programmed second programmable function to the stored identities, and creating a modified list of linear adverts and non-linear adverts, respectively.

3. The method of claim 1 in which the first programmable function and the second programmable function are dynamically programmed according to the video playback device.

4. The method of claim 3 in which the first programmable function and the second programmable function are dynamically programmed differently for different devices associated with a same user.

5. The method of claim 1 in which both the criteria of minimizing an impact on an end-user and maximizing a number of commercials shown are selected.

6. A non-transitory computer program medium for storing computer program code which, when executed on a computing device, performs the method of claim 1.

7. A video playback device for playing video content associated with commercials including at least one linear advert and at least one non-linear advert, the device being configured, in dependence on forwarding of the video content, to:

play the video content;

receive a command to forward the video content from time $t_1$ to time $t_2$;

determine a set of linear adverts and a set of non-linear adverts that are skipped in forwarding the video content from time $t_1$ to time $t_2$ wherein the determined sets are subsets of all the commercials that could have been shown between time $t_1$ and time $t_2$, excluding commercials between time $t_1$ and time $t_2$ for which it cannot be verified a trigger condition would have validly occurred between time $t_1$ and time $t_2$;

access a programmable function for determining playback of the set of linear adverts and the set of non-linear adverts that are skipped;

access a plurality of criteria for the playback of the set of linear adverts and the set of non-linear adverts that are skipped, the criteria comprising maximizing number of commercials that are shown and minimizing impact on end-user experience;

select at least one of the plurality of criteria for the set of linear adverts and at least one of the plurality of criteria for the set of non-linear adverts;

dynamically program a first programmable function for the set of linear adverts in dependence on the selected criteria;

dynamically program a second programmable function for the set of non-linear adverts in dependent on the selected criteria;

apply the dynamically programmed first programmable function for the set of linear adverts to determine a playback subset of linear adverts that are skipped when the forwarded video content is played at time $t_2$ in dependence on the at least one criterion;

apply the dynamically programmed second programmable function for the set of non-linear adverts to determine a playback subset of non-linear adverts that are skipped when the forwarded video content is played at time $t_2$ in dependence on the at least one criterion;

play, from time $t_2$, the subset of linear adverts that are determined for playback from time $t_2$;

play the video content on completion of the playing of the determined subset of linear adverts after time $t_2$; and playing the subset of non-linear adverts that are determined for playback after resumption of video playback.

8. The video playback device of claim 7 further comprising:

a memory configured to store identities of the linear adverts and the non-linear adverts that are skipped, apply the dynamically programmed first programmable function and the dynamically programmed second programmable function to the stored identities, and create a modified list of linear adverts and the non-linear adverts.

9. A plurality of devices each including a video playback device according to claim 7, in which the video playback device of at least one device is dynamically programmed to have a different programmable functionality from other video playback devices.

10. The plurality of devices of claim 9 in which the plurality of devices are associated with a same user.

* * * * *